July 7, 1931.   J. F. PETRE   1,813,255
MEANS FOR REMOVING WATER FROM MOTOR BOATS
Filed May 2, 1930   2 Sheets-Sheet 2
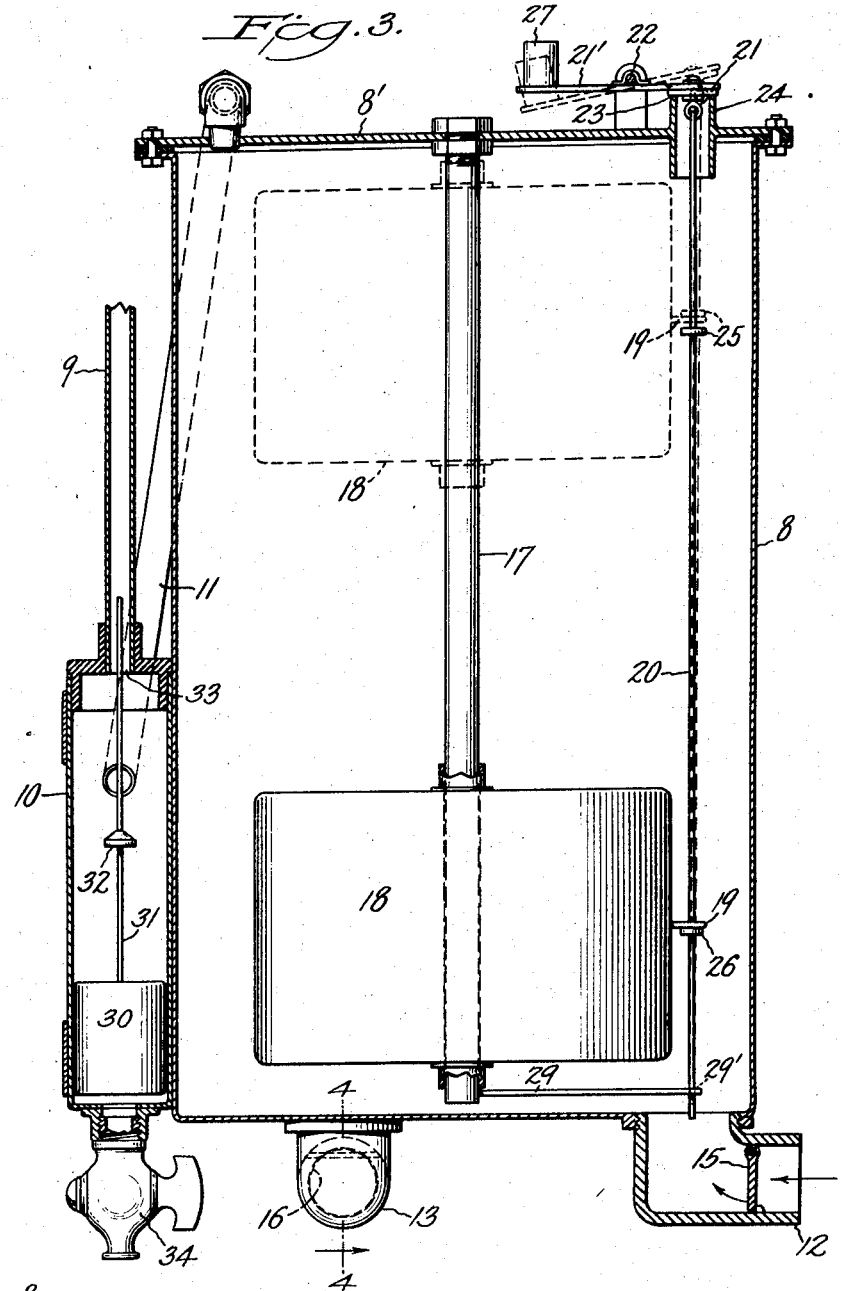
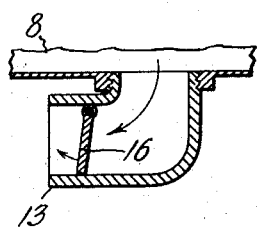

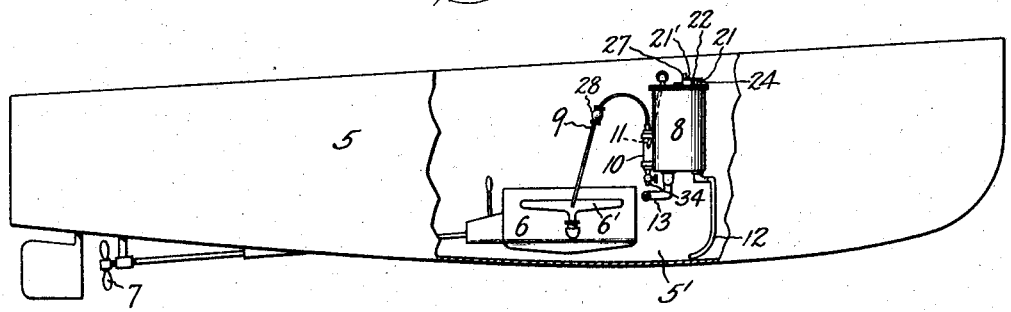
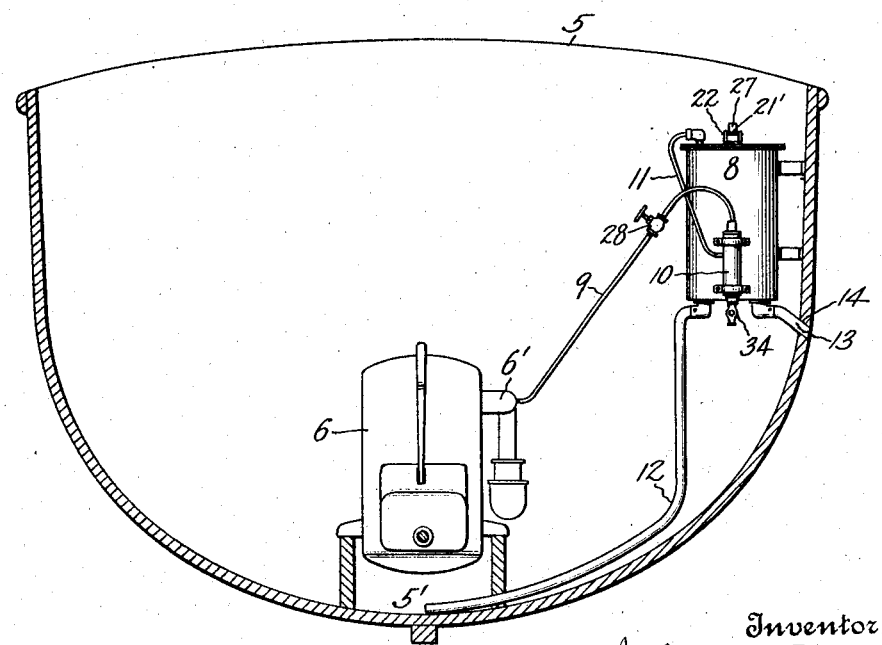

Patented July 7, 1931

1,813,255

UNITED STATES PATENT OFFICE

JOHN F. PETRE, OF FARMINGDALE, NEW YORK

MEANS FOR REMOVING WATER FROM MOTOR BOATS

Application filed May 2, 1930. Serial No. 449,180.

This invention is concerned with the removal of water from motor boats. An object of the invention is to provide means simple in construction and efficient in operation whereby the removal of water from boats may be expeditiously accomplished. Another object is the provision of means fulfilling the conditions above noted and operable by the suction developed in the internal combustion engine which drives the boat. I shall describe an embodiment of my invention in the ensuing specification and point out the novel features thereof in claims.

In the accompanying drawings:

Fig. 1 is a side elevation of a motor boat, partly broken away, showing an embodiment of my invention applied thereto.

Fig. 2 is a transverse vertical sectional view through the boat.

Fig. 3 is a vertical sectional view, on an enlarged scale, showing means for automatically controlling the removal and discharge of water from the boat.

Fig. 4 is a sectional view of a detail on line 4—4 of Fig. 3.

Referring to the drawings there is shown at 5 a motor boat having an internal combustion engine 6 of conventional type and driving the propeller 7 in the customary manner. In carrying out my invention I provide a casing or chamber 8 connected through a pipe or conduit 9 to the intake or suction manifold 6' of the engine 6. I have shown the conduit 9 connected at one end to said suction manifold and at its other end to an auxiliary chamber 10, which communicates with the main casing or chamber 8 through a pipe 11. The chamber 10 may conveniently be attached to the casing 8 as shown.

Connected to the bottom of the casing 8 and extending into the bilge 5' of the boat is an intake pipe 12. An outlet pipe 13, connected to the bottom of casing 8 is adapted to convey water to the exterior of the boat, for which purpose said pipe is shown extended into an opening 14 in the side of the boat. The pipe 12 has mounted therein an inlet valve 15 while an outlet valve 16 is mounted in the pipe 13.

Slidably mounted on a rod 17 depending from the top of casing 8 is a float 18 having a finger 19 projecting therefrom and embracing a rod 20. The latter is connected as shown to a vent valve 21 which is carried by an arm 21' pivotally mounted at 22 on the top of casing 8. Normally said valve 21 closes an opening 23 in a sleeve 24 mounted in the top of the casing and communicating with the interior thereof.

The operation of the parts above described is as follows. When the engine 6 is in operation, suction is produced in the casing 8, since the latter is connected through pipe 11, chamber 10, and pipe 9 with the suction or intake manifold 6'. The inlet valve 15 in pipe 12 is thereby opened and outlet valve 16 maintained closed. Since the pipe 12 extends into the bilge of the boat, water from said bilge is drawn through said pipe and into casing 8 in response to the suction aforesaid. As the casing 8 fills with water, the float 18 therein rises, and when said float nears the top of said casing the finger 19 strikes a lug 25 on the rod 20 and raises said rod, thereby lifting the vent valve 21, as shown in dotted lines, and admitting air into casing 8. The suction in said casing is thus destroyed. Inlet valve 15 now closes and outlet valve 16 opens, and the water in the casing 8 flows out through pipe 13 and thence to the exterior of the motor boat. As the water flows out of casing 8, the float 18 moves downwardly until, when finger 19 strikes a lug 26 on rod 20, the vent valve 21 is closed. During the descent of the float 18, and until operation of rod 20 by the action of finger 19 on lug 26, the valve 21 remains open owing to the counterweight 27 which is connected to the valve arm 21' as shown. Upon closing of the vent valve 21 by the engagement of finger 19 with lug 26, the suction from the engine 6 again becomes active in casing 8; the outlet valve 16 closes, the inlet valve 15 opens, and the cycle of operation is repeated.

If desired, a manually operable valve 28 may be inserted in pipe 9 so that the operator may place the casing 8 into and out of communication with the suction manifold 6' at will. When said valve is positioned for placing said casing in communication with said suction manifold, the drawing of water from the bilge into casing 8 and the discharge of water from said casing to the exterior of the boat continues automatically and in cyclic order under the control of float 18 as above pointed out. After the bilge has been emptied, the valve 28 may be so positioned as to cut off communication between the casing 8 and the suction manifold 6'.

The rod 20 may be steadied and guided in its movements by an arm 29 fastened to the rod 17 and having a hole 29' near one end thereof, through which hole said rod 20 passes.

To insure that water will not be sucked into the internal combustion engine in the event that for some reason the float 18 should become stuck and thus fail to open the vent valve 21 at the proper time, I have provided the following means:

A float 30 is mounted within the auxiliary chamber 10 and has extending therefrom a stem 31 carrying a valve 32. Should float 18 for any reason fail to function to prevent water from flowing through pipe 11, the entry of water from said pipe into casing 10 causes float 30 to rise and thereby to raise the valve 32 so that the latter closes the opening 33 in the end of pipe 9. Suction is thereby cut off from the chambers 8 and 10 and water is prevented from being drawn through pipe 9 into the intake or suction manifold 6'. For enabling the operator to withdraw any water which may collect in chamber 10 a drain cock 34 is shown connected to the bottom of said chamber.

The top 8' of the chamber 8 is detachably secured in any convenient way to the body of said casing so that said top may be removed and access obtained to the interior of the casing whenever desired.

The terms and expressions which I have employed are used as terms of description and not of limitation, and I have no intention, in the use of such terms and expressions, of excluding any mechanical equivalents of the features shown and described or portions thereof, but recognize that various structural modifications are possible within the scope of the invention claimed. It will be understood further that the internal combustion engine to the suction manifold of which the pipe 9 is connected need not be an engine for driving the boat, but may be an engine on a boat which is driven by some other means.

What I claim is:

1. In a motor boat, a chamber having an intake connection with the bilge of the boat and an outlet connection to the exterior of the boat, an internal combustion engine including a suction manifold, and means comprising a connection from said chamber to said manifold for causing the removal of water from said boat.

2. In a motor boat, a chamber having an intake connection with the bilge of the boat and an outlet connection to the exterior of the boat, means whereby suction is produced in said chamber for drawing water thereinto from said bilge, a float controlled by the water in said chamber, and means controlled by said float for destroying the suction in said chamber.

3. In a motor boat, a chamber having an intake connection with the bilge of the boat and an outlet connection to the exterior of the boat, means whereby suction is produced in said chamber for drawing water thereinto from said bilge, a float controlled by the water in said chamber, means operable by said float when in one position for destroying the suction in said chamber, and means operable by said float when in another position for disabling said suction-destroying means.

4. In a motor boat, a chamber having an intake connection with the bilge of the boat and an outlet connection to the exterior of the boat, means whereby suction is produced in said chamber for drawing water thereinto from said bilge, a float controlled by the water within said chamber, and means governed by said float for controlling the suction in said casing.

5. In a motor boat, a chamber having an intake opening, a valve controlling said opening, means connecting said opening with the bilge of the boat, an outlet connection to said chamber and extending to the exterior of the boat, a valve in said connection, suction means for drawing water through the intake opening into said chamber, and means controlled by the quantity of water within said chamber for rendering ineffective said suction means.

6. In a motor boat, a chamber having an intake connection with the bilge of the boat and an outlet connection to the exterior of the boat, valves in said connections and combined suction and float-controlled means for governing the operation of said valves.

7. In a motor boat, a chamber having an intake connection with the bilge of the boat and an outlet connection extending to the exterior of the boat, valves in said connections, suction means for causing the intake valve to open and for drawing water through the intake connection, and means controlled by the quantity of water in the chamber for causing the outlet valve to open to permit discharge of the water in said chamber.

8. In a motor boat, a chamber having an intake connection with the bilge of the boat and an outlet connection extending to the exterior of the boat, a source of suction, means connecting said source with said chamber whereby suction is produced in said chamber for drawing water thereinto from said bilge, means controlled by the water in said chamber for destroying the suction therein upon the accumulation of a given quantity of water in said chamber; and means brought into action in the event of failure of said suction-destroying means for preventing water from being drawn into the suction source.

9. In a motor boat, a suction line extending into the bilge of the boat, means for producing suction in said line, and float controlled means for destroying the suction in said line.

10. In a motor boat, an internal combustion engine for driving said boat, a chamber having an inlet connection with the bilge of the boat and outlet connection with the exterior of the boat, a connection from said chamber to the intake manifold of the internal combustion engine whereby suction is produced in said chamber, a float in said chamber, and means controlled by said float for controlling the suction in said chamber.

11. In a motor boat, an internal combustion engine for driving said boat, a chamber connected to the suction manifold of said engine, an intake connection from said chamber to the bilge of the boat, and an outlet connection from said chamber to the exterior of the boat, means for causing discharge of water from said chamber through said outlet connection upon the accumulation of a predetermined quantity in said chamber, and means for preventing the drawing of water into said suction manifold.

12. In a motor boat, an internal combustion engine for driving said boat, a chamber connected to the suction manifold of said engine, an intake connection from said chamber to the bilge of the boat, an outlet connection from said chamber to the exterior of the boat, means for causing discharge of water from said chamber through said outlet connection upon the accumulation of a predetermined quantity in said chamber, and float controlled means for preventing the drawing of water into said suction manifold.

13. In a motor boat, an internal combustion engine for driving said boat, a chamber connected to the suction manifold of said engine, an intake connection from said chamber to the bilge of the boat, an outlet connection from said chamber to the exterior of the boat, means for causing discharge of water from said chamber through said outlet connection upon the accumulation of a predetermined quantity in said chamber, an auxiliary chamber connected to the first mentioned chamber, and means in said auxiliary chamber for preventing drawing of water into said suction manifold in the event of failure of said discharge means.

14. In a motor boat, a chamber, suction means for drawing water from the bilge of the boat into said chamber, and means brought into action by the accumulation of a predetermined quantity of water in said chamber for causing said water to be discharged to the exterior of the boat.

In testimony whereof, I have signed my name to this specification this 29th day of April, 1930.

JOHN F. PETRE.